May 6, 1930.  H. G. SIMMONS  1,757,261
DOORCHECK
Filed Jan. 10, 1929
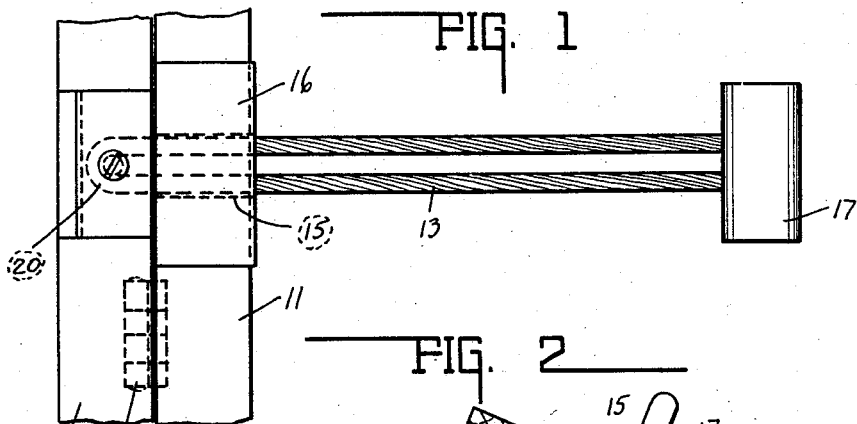
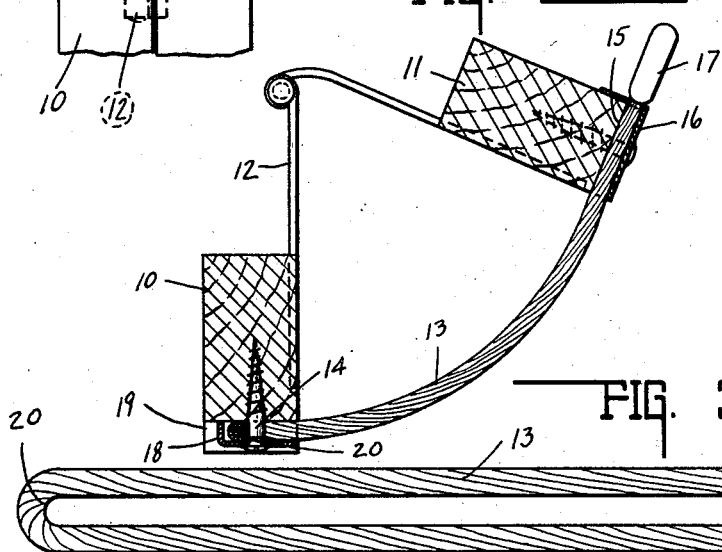
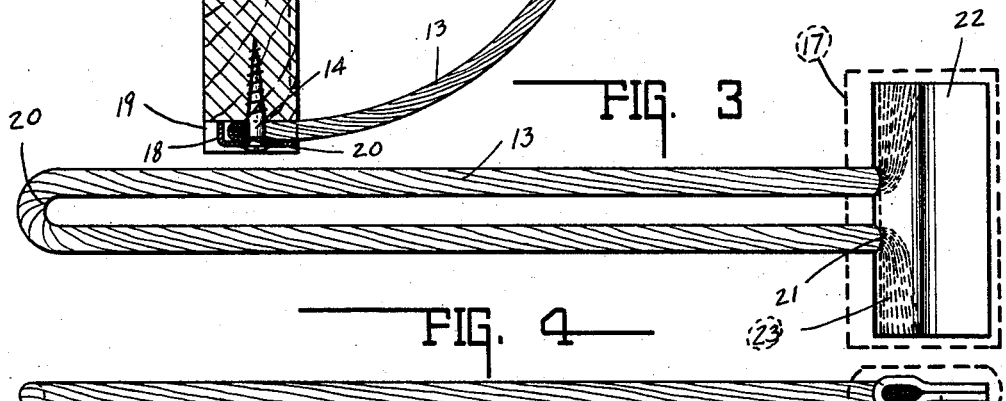
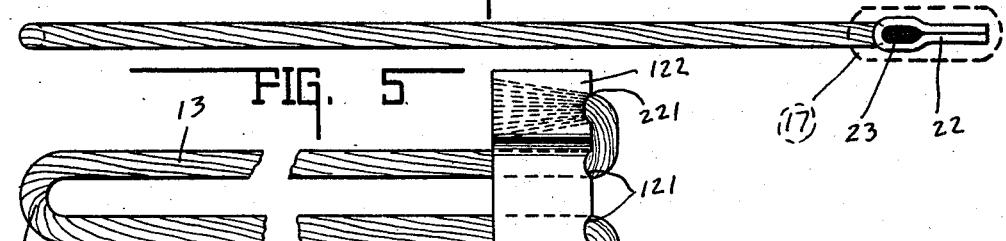
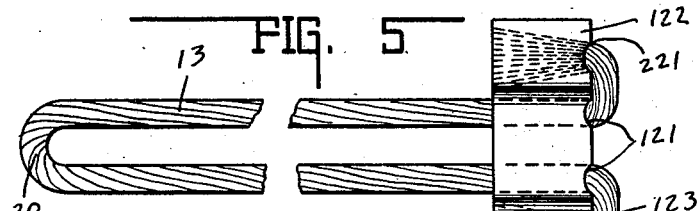
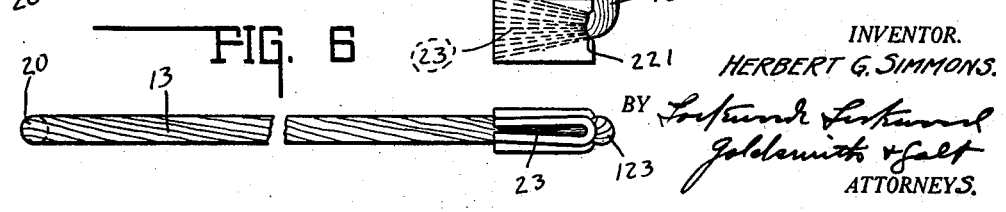
INVENTOR.
HERBERT G. SIMMONS.
BY
ATTORNEYS.

Patented May 6, 1930

1,757,261

UNITED STATES PATENT OFFICE

HERBERT G. SIMMONS, OF KOKOMO, INDIANA, ASSIGNOR TO CONCEALED DOOR CHECK COMPANY, OF KOKOMO, INDIANA, A CORPORATION

DOORCHECK

Application filed January 10, 1929. Serial No. 331,536.

This invention relates to a door check, particularly that type known to the trade as a concealed door check adapted to slide in and out behind the upholstery of a vehicle, but as distinguished from the loop type of check, which loops outwardly upon closing the door.

The principal object of this invention resides in the construction of a check which will be extremely economical in manufacture, and have great holding power as compared with other checks of this character.

Another feature of the invention resides in the simplified and relatively strong holding or anchoring arrangement for the fixed end of the check, as well as the resilient and yielding bumper on the free end thereof.

More specifically, the invention consists in the construction of a door check, particularly adapted for sliding in and out of a vehicle door or pillar behind the upholstery so that when the door is in closed position the check will be concealed, the check being formed of a heavy cable which is looped so as to provide a looped end and a pair of adjacent free ends, the looped end being adapted to receive an anchoring screw or similar member for anchoring the fixed end of the strap, while the free ends are clamped rigidly and enveloped within a head formed of a plate of heavy metal through which they extend, said plate being bent on itself and tightly clamped.

The resilient bumper element is provided by inclosing the head plate within a heavy layer of rubber which will fully protect the same and prevent undesired noises by reason of contact with the rigid parts of the door body. By reason of the heavy character of the cable and the head, vibration and rattle is eliminated by reason of the sluggish movement thereof so that rapid vibration set up in the body will not create similar vibrations in the check such as to cause undesired vibratory noises.

The full nature of the invention will be more clearly understood from the accompanying drawings and the following description and claims.

Fig. 1 is a plan view of a portion of a vehicle body and door with the door check installed therein. Fig. 2 is a section through the pillars of the body and door moved to open position with the door check limiting the movement thereof. Fig. 3 is an enlarged view of the door check showing the metal head with the rubber removed. Fig. 4 is the same as Fig. 3 showing a side elevation of the check. Fig. 5 is the same as Fig. 3 showing a modified form thereof. Fig. 6 is an end elevation of the modified form shown in Fig. 5.

In the drawings there is shown a vehicle body 10 and a door pillar 11 connected by the usual hinge structure 12. As illustrated in Fig. 1, the door check 13 is anchored rigidly at one end by the screw 14 and has its other end slidably mounted within a suitable recess 15 in the pillar 11 covered by an apertured plate 16 for permitting relative sliding movement between the pillar 11 and the check 13 limited by the resilient rubber bumper head 17. A suitable cover plate 18 is provided at the fixed end of the check and secured in place by the screw 14 within the recess 19 for further assisting in anchoring and firmly holding the fixed end of the strap.

As best illustrated in Fig. 3 the strap comprises a relatively heavy wire cable which is looped intermediate its ends to provide the looped end 20 so that the legs of the cable extend parallel with each other in spaced relation. The free ends of the cable extend through spaced apertures 21 in the metal plate formed intermediate the edges of the head plate 22. The free ends 23 of both legs of the cable are spread outwardly in opposite directions and firmly clamped in position by folding the plate 22 thereover, as illustrated in Fig. 4.

In the modified form shown in Figs. 5 and 6 the head plate 122 is reversed from the arrangement shown in Figs. 3 and 4 so that the free ends of the cable extend through the open side thereof and the spaced apertures 121 in the rear folded edge. Thereupon, the free ends 23 of the cable are reversed upon themselves to provide the bends 123 and extend forwardly through the spaced apertures 221. Thus, a double clamping action is obtained, as well as a firmly tying-in of the free ends of the cable within the head plate.

The invention claimed is:

1. A door check comprising a cable folded intermediate its ends to provide a looped end and a pair of legs extending therefrom parallel to each other in spaced relation, and a metallic head plate having a pair of spaced apertures therein through which the free ends of said cable are adapted to extend, said head plate being folded to envelop the free ends extending therein and clamped in folded position for rigidly securing the free ends of said cable firmly therein.

2. A door check comprising a cable folded intermediate its ends to provide a looped end and a pair of legs extending therefrom parallel to each other in spaced relation, a metallic head plate having a pair of spaced apertures therein through which the free ends of said cable are adapted to extend, said head plate being folded to envelop the free ends extending therein and clamped in folded position for rigidly securing the free ends of said cable firmly therein, and a rubber bumper element formed about said head plate so as to provide a shock absorbing end for said check.

3. A door check comprising a cable folded intermediate its ends to provide a looped end and a pair of legs extending therefrom parallel to each other in spaced relation, and a metallic head plate having a pair of spaced apertures therein through which the free ends of said cable are adapted to extend, said free ends being bent outwardly away from each other and said head plate being folded at said apertures to envelop said outwardly extending free ends and clamp them between the folded portions thereof for rigidly securing said cable and head plate together.

4. A door check comprising a cable folded intermediate its ends to provide a looped end adapted to receive an anchor member therein for fixedly securing the looped end in operative position, a pair of legs extending from said looped end parallel to each other and in spaced relation, and a metallic head plate folded on itself into which the free ends of said cable are adapted to extend, said folded head plate having its side walls clamped rigidly together so as to envelop and fixedly clamp the ends of said cable therein so as to be firmly secured thereto and thereby provide an enlarged head for limiting the operative action of said strap.

5. A door check comprising a cable folded intermediate its ends to provide a looped end adapted to receive an anchor member therein for fixedly securing the looped end in operative position, a pair of legs extending from said looped end parallel to each other and in spaced relation, a metallic head plate folded on itself into which the free ends of said cable are adapted to extend, said folded head plate having its side walls clamped rigidly together so as to envelop and fixedly clamp the ends of said cable therein so as to be firmly secured thereto and thereby provide an enlarged head for limiting the operative action of said strap, and a resilient shock absorbing member mounted on the forward face of said head plate in position to receive and absorb the force of impact upon said check reaching the limit of its operative action.

In witness whereof, I have hereunto affixed my signature.

HERBERT G. SIMMONS.